July 5, 1960   F. S. REPLOGLE, JR., ET AL   2,944,150
MEANS FOR MODULATING AND DETECTING NEUTRON FLUX
Filed June 17, 1954
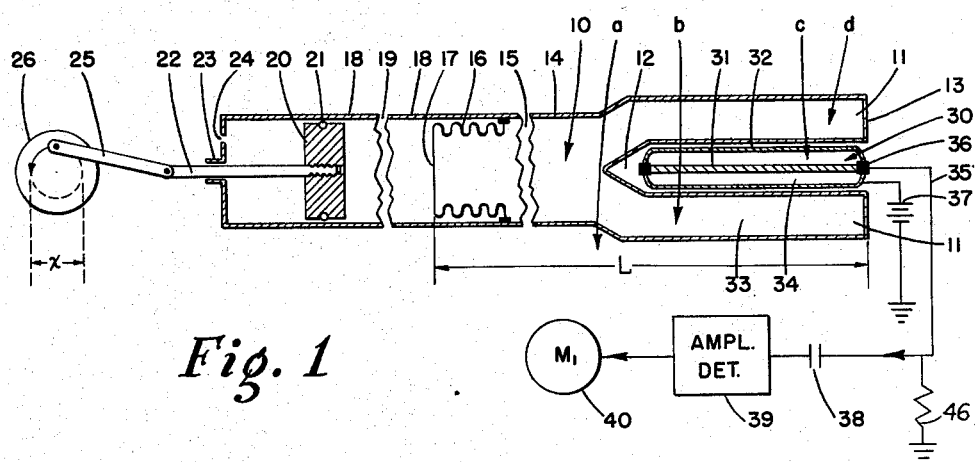
Fig. 1
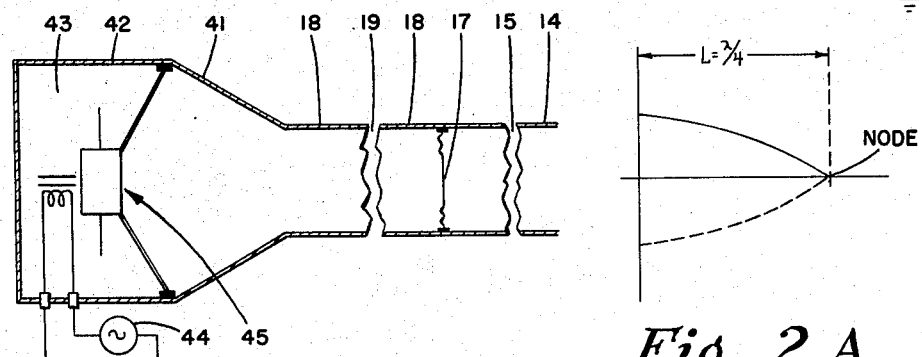
Fig. 2
Fig. 2A
Frank S. Replogle   Inventor
Donald A. Gordon
By W. R. Malttp
Attorneys

United States Patent Office 2,944,150
Patented July 5, 1960

2,944,150
MEANS FOR MODULATING AND DETECTING NEUTRON FLUX

Frank S. Replogle, Jr., Arlington, Mass., and Donald A. Gordon, York, Maine, assignors, by mesne assignments, to the United States of America as represented by the Secretary of the Navy Filed June 17, 1954, Ser. No. 437,596

12 Claims. (Cl. 250—83.1)

This invention relates generally to the measurement of flux density of ionizing particles and more particularly to means rendering a normally steady density of slow neutron radiation variable so that it may be measured by alternating current methods, within a background of radiation such as within a nuclear reaction pile.

It has been the practice in atomic research and in measurement of density of various forms of subatomic particles to employ an ionization chamber which is designed to be effective to capture a percentage of the passing particles, or in passing, ionize the gas contained in the ionization chamber, and then to measure the ion current resulting from direct current polarization of the chamber.

Various difficulties arise with this system particularly when there may be numerous causes of ionization in the ion chamber, for example, the circumstances surrounding any particular measurement may involve both fast and slow neutrons which contribute portions to the total ionization. While the chamber may be filled with appropriate gas or designed to greatly favor either the slow or fast neutrons, the other of the two is present to some undetermined extent. Also passing electrons are highly effective in producing ionization unless these are prevented from entering the ionization chamber. Likewise γ radiation is efficient in producing ionization in the gas of the ionization chamber. Furthermore, it is usually not possble to entirely exclude these various sources of background radiation when it is desirable, for example, to measure slow neutron concentrations. Ordinarily, there is associated with such measuring techniques a background of ionization so high and so variable that the direct current method of measurement is not effective. This difficulty applies generally to measurement of density of uncharged ionizing radiations.

Accordingly, it is the object of this invention to provide means for modulating the number or intensity of uncharged particles passing into or through an ion chamber. A further object is to provide a method and means for modulating slow neutron intensity where it is not possible to modulate the emitting source. A still further object of the invention is to provide method and means for measuring a relatively constant slow neutron density in the presence of variable ionizing radiations of other types. A still further object is to provide means for periodically varying the absorptivity of a particle absorbing chamber. Other objects and attendant advantages will be appreciated as the invention becomes better understood with reference to accompanying figures in which;

Fig. 1 is a diagrammatic and sectional view of one form of the invention.

Fig. 2 is a fragmentary view of the apparatus of Fig. 1 showing alternative sound producing means and, Fig. 2A is a diagram illustrating the relationship between length of absorption chamber and wave length of exciting sound.

Referring now to the drawings wherein like numerals designate like parts throughout the several views, and more particularly to Fig. 1, there is shown generally an absorption chamber 10, normally filled with a gas either at atmospheric or elevated pressure, arranged in size and shape to produce a certain percentage of absorption of the incident particles changing concentrations whereof are to be measured. The chamber 10 has an enlarged portion 11 formed into a hollow cylinder or annulus having a central air-filled chamber 12 of size suitable for receiving an ionization chamber. The chamber 10 terminates at one closed end 13 and has a further portion of reduced diameter 14 which does not contain the cavity 12. The chamber 14 is shown broken as at 15 and terminated at the end opposite 13 in a flexible diaphragm, bellows or like structure 16 including a movable end portion 17. The distance between diaphragm or other closure 17 and the termination 13 is the effective length of the absorption chamber 10 here referred to as "L."

The absorption chamber housing may be conveniently further extended as at portion 14, the extended portion being a sound channel designated 18. The diameter of portion 14 is preferably chosen to prevent acoustic mismatch between portions 11 and 14. This extended portion is shown broken at 19, the length being selected according to various circumstances such as the desirability of producing a resonant action at a particular sonic frequency, remoteness of position of measurement within a reaction pile, etc. In one form of the invention, the extension 18, is air-filled and contains a piston 20 capable of moving up and down the channel 18 through a distance X to provide a predetermined variation of pressure within the channel 18. The piston is preferably provided with a sealing ring of suitable form such as, for example, an O ring which is snugly fitted into a groove in the piston periphery such that the ring is in sliding contact within chamber 18 and lubricated as appropriate. The piston is actuated by the piston rod 22 passing through a sleeve joint or other position controlling bearing attached to the end of the chamber 18. A vent such as 24 is provided in order that air may enter and leave the end of the channel 18 as the piston moves. The piston rod is illustrated as driven by a connecting rod 25 and a fly-wheel, crank or the like 26, which in turn is driven by any suitable rotative means.

It will be seen that as the wheel 26 is driven the rod 25 drives the piston 20, thereby varying the pressure of air or other gas within the chamber 18. This pressure change is imparted to the bellows or diaphragm 16 and 17, which have high compliance and thereby transmit the pressure wave to the absorption chamber 10.

Within the cavity 12 is disposed an ionization chamber 30 of any suitable and conventional design such as will be appropriate to the detection of selected types of particles passing therethrough. Ordinarily this ionization chamber will be cylindrical in form having a central ion collecting rod 31 longitudinally disposed therein and will have a metallic enclosing cylinder, or a nonconducting cylinder having a conducting lining deposited on the interior surface thereof. In any event the chamber is filled with a gas 34 selected as to composition and pressure such that it will absorb, or be ionized by, a large percentage of the particles entering the same. When it is desired to detect slow neutrons, the gas 34 may be boron trifluoride or other boron-containing gas. Likewise the chamber 10 is filled with a gas suitable for absorbing or stopping a considerable portion of the particles, for example neutron flux; constituting the subject of measurement. The ionization chamber is preferably provided with insulating means 36 whereby the rod 31 is insulated from the conducting coating 32 and the lead 35 brought out from the rod. Such an ionization chamber is conventionally energized by a direct current power supply illustrated at 37.

In order to achieve the objectives of the present invention, it has been found that a varying pressure in the chamber 10, constituting a variable density of the gas 33, forms a variable absorbing path for particles passing through the apparatus. In operation the piston movement is made large and of sonic frequency so that a very high intensity sound wave is transmitted to the gas 33. As illustrated, the section 11 of the chamber is an annulus of extent sufficient to accommodate the ionization chamber 30 and of outer diameter conveniently about three times the diameter of the chamber 30. The annulus is of thickness comparable to that of the ionization chamber for best results if gases of similar molecular constants are used.

There are illustrated particles entering the chamber 10 having designations "a," "b," "c," and "d." Neutrons of particular energy illustrated at "a" will pass entirely through the chamber. A second particle illustrated at "b" and having the same energy as particle "a," which arrives when the pressure of gas 33 in the chamber 10 is increased is unable to pass entirely through the chamber 10. Other particles having lesser energy as "c" and "d" may not pass entirely through the ionization chamber or may be stopped in the first annulus region of the position 11 of the chamber 10. It will be seen that a larger percentage of the particles having the energy illustrated at "d" will be stopped before entering the ionization chamber when the pressure of gas 33 is increased. Accordingly, suitable indicating apparatus employed with the ionization chamber is made responsive to the variation at the selected sonic frequencies of ionization occurring within chamber 30.

The ionization circuit for detecting and measuring flux density in the chamber 30 may be of any conventional type except that for the present invention it is desired to exclude all ionization effects which are not the subject of measurement. By selection of suitable pressures of a slow neutron absorbing gas, a substantial percentage of the slow neutrons passing through the chamber 30 are subject to the changing pressure of gas 33 in the portion 11 of the absorption chamber.

A slow neutron detector such as the ionization chamber illustrated and described will exhibit a large direct current ion current and a lower modulated ion current, which may be separated from the steady background by means of a suitable amplifier and detector arrangement. There is illustrated in series with the detector a condenser 38 suitably connected to the conducting cylinder 32 and to an alternating current amplifier and detector 39. A resistor 46 connects lead 35 to ground and provides a path for the direct current component of the modulated ion current. The apparatus 39 might be any suitable amplifier followed by a rectifier, the output of which may be observed as convenient on some instrument such as meter 40, or a recorder.

The means for producing variable pressure illustrated in Fig. 1 is one of a number which might be selected for the purpose. It is essential that a considerable variation of pressure within gas 33 be produced in order that the variable portion of the neutron or other particle flux to be measured shall contribute an appreciable percentage to the total ionization current and that the amplified and detected current shall not be masked by spurious variations of background ionizing radiation observed as a varying ion current from sources other than that to be measured. By use of the piston and driving means illustrated, it is possible to employ a pressure variation of 0.2 atmosphere or more. It is found that the modulation pressure of 0.2 atmosphere for boron trifluoride at atmosphere pressure produces a change in absorption in the chamber annulus at 11 sufficient to provide a good alternating current signal to the detector 39. The choice of frequency for modulating the pressure depends upon a number of factors including the type of variation in background noise which may be expected, for example, in a nuclear pile reactor. The apparatus illustrated in Fig. 1 might be useful for example at 30 cycles per second at which rate the piston 20 may be readily driven without severe difficulties, the wheel 36 accordingly being driven at 1800 r.p.m.

For many purposes, it is desirable to drive the gas pressure modulation at approximately 500 c.p.s. For this purpose some other driving mechanism is preferred and there is illustrated one form of suitable apparatus in Fig. 2. The channel 18 is illustrated as having an enlarged funnel portion 41 terminated in an acoustic drive mechanism electrically operated from a suitable alternating current source such as 44 which actuates an electromechanical drive 45. This drive may take the form of a conventional speaker assembly with source 44 energizing the voice coil thereof. The problem of driving an acoustic source at 500 cycles with sufficiently large excursions to produce a 20 percent change of pressure in channel 18 is difficult of solution since the acoustic energy represented is in the order of 180 db, well above the threshold of pain. It is recalled that the change of pressure desired is of the order of a 0.2 atmosphere regardless of total pressure and that this may be achieved in a pressurized region, for example, at 5 atmospheres without the otherwise severe difficulty of producing the sound energy. For this purpose a closed portion 42 seals the region beyond the acoustic drive mechanism 45, which is then conveniently brought to the same pressure as the air pressure within the channel 18. Accordingly, the gas 33 is similarly brought to 5 atmospheres such that small excursions of the acoustic drive and of the diaphragm 17 are sufficient to produce within the absorbing region 11 a 0.2 atmosphere variation of pressure. A further means may be provided for increasing the effect of the modulating excursions in the acoustic drive 45 which comprises dimensioning the chambers 10 and 18 such that resonance is produced and standing pressure waves are developed between the two ends. If the diaphragm or bellows 16 and 17 is sufficiently compliant that it will be negligible in its total effect upon the combined length of channel 18 and channel 10, this combined length may be regarded as length L and may be made equal to one quarter of the wave length of the frequency of the acoustic excitation. For this purpose, it will be convenient to fill the channel 18 with gas of the same density as the gas 33. Since this gas is normally heavier than air it will have a shorter wave length than air and a further reduction in diaphragm excursion for the 0.2 atmosphere change of pressure is achieved. The combined result is such that relatively small diaphragm excursions are adequate to provide the required degree of pressure variation in chamber 10.

Obviously any form of drive mechanism for producing pressure variations in the portion 11 of the absorption chamber will be useful and convenient provided a minimum degree of change is made effective in the absorptivity associated with the annulus 11 surrounding the ionization chamber. The pressurized chamber 43 is made large, when employed, to decrease adiabatic losses.

It will be seen that the diaphragm or stop 17 may be driven by the acoustic driving force in synchronism with a natural period of resonance in the chamber 10, to produce resonance in the gas 33, the air or other gas in channel 18 being driven without resonance by the acoustic drive. In this case the length L is as illustrated in Fig. 2A, being one-fourth wave length of the sound waves for the selected gas in chamber 10. In this modification resonance is confined to the chamber 10 rather than the combined length of 10 and 18.

Obviously many modifications and variations of the present invention are possible in the light of the above teachings. It is therefore to be understood that within the scope of the appended claims the invention may be practiced otherwise than as specifically described.

What is claimed is:

1. A device for measuring the intensity of slow neutrons passing through a space comprising, an ionization chamber responsive to passage of said neutrons to produce an ion current therefrom, means energizing said chamber at a direct current polarization, an absorbing medium surrounding said chamber including a boron constituent selectively absorptive of slow neutrons, means impressing upon said medium a variation of pressure at a sonic frequency, means separating components of said ion current of direct current nature from components of alternating current nature at said frequency, and means indicative of magnitude of said alternating current representative of the total slow neutron intensity in said space.

2. A device for measuring the intensity of bombardment of a space by uncharged atomic particles comprising, an ion chamber filled and energized to produce an ion current in response to passage of said particles, an indicating device responsive to alternating current components of said ion current connected to receive the output of the chamber, a gas filled absorption chamber surrounding said ion chamber and having therein an amount of gas adequate to absorb only part of said particles in said space, and means varying at a sonic frequency the quantity of said gas surrounding the ion chamber, whereby the number of said particles entering the ion chamber is modulated at said frequency to produce an alternating current output to the indicating device.

3. A device according to claim 2 wherein the absorption chamber is filled with a boron content gas to selectively absorb a percentage of thermal neutrons passing therethrough.

4. A device according to claim 2 wherein said means for varying the quantity of gas is a cylinder communicating with an end of the absorption chamber through pliant pressure transferring means and containing a gas driven at said frequency by a high energy sound source.

5. A device according to claim 2 including a sound channel driven at high sonic energy and means coupling the pressure variations in the sound channel to the gas in the absorbing chamber.

6. A device according to claim 5 including a piston driven at said frequency in amplitude to produce substantially three pounds per square inch pressure difference in the absorption chamber.

7. A device according to claim 5 including a sonically driven speaker having sound output coupled to said absorption chamber to produce therein pressure variations constituting a substantial fraction of one atmosphere.

8. A device according to claim 7 wherein the absorption chamber is proportioned in length to the frequency of sonic excitation such that a quarter wave standing wave persists while excitation continues, thereby to enhance pressure variations in the absorption chamber for a given speaker excitation amplitude.

9. A neutron flux modulator and detector comprising, in combination, a neutron responsive ionization chamber and means for surrounding said ionization chamber with a volume of neutron absorbing gas, and means for cyclically varying the pressure of said gas to modulate the density of neutrons arriving at said ionization chamber via said volume.

10. A neutron flux modulator and detector comprising, in combination, a neutron responsive ionization chamber, means for exciting a standing pressure wave in a neutron absorbing gas atmosphere adjacent to said chamber whereby the density of the neutrons reaching said chamber after passing through said atmosphere is modulated at the frequency of said standing pressure wave.

11. A slow neutron flux modulator comprising an enclosed vessel, said vessel being filled with a neutron absorbing gas, means for exciting an acoustic standing-pressure wave within said vessel, an ionization chamber positioned adjacent to said vessel whereby the ionization current developed in said chamber by neutrons which pass through said vessel before reaching said chamber has an alternating current characteristic the frequency of which corresponds to that of said acoustic standing-pressure wave.

12. In a modulator as defined in claim 11 wherein said ionization chamber position is adjacent to that region in said vessel where the density of the neutron absorbing gas undergoes a maximum amplitude of oscillation.

References Cited in the file of this patent

UNITED STATES PATENTS

| | | |
|---|---|---|
| 2,445,305 | Hochgesang | July 13, 1948 |
| 2,523,287 | Friedman | Sept. 26, 1950 |
| 2,556,768 | McKibben | June 12, 1951 |
| 2,781,307 | Wigner | Feb. 12, 1957 |
| 2,795,704 | Bryant et al. | June 11, 1957 |